(12) United States Patent
Rasmussen et al.

(10) Patent No.: US 7,599,790 B2
(45) Date of Patent: Oct. 6, 2009

(54) GENERATING AND SERVING TILES IN A DIGITAL MAPPING SYSTEM

(75) Inventors: Jens Eilstrup Rasmussen, San Francisco, CA (US); Lars Eilstrup Rasmussen, Fairlight (AU); Stephen Ma, Kingsford (AU)

(73) Assignee: Google Inc., Mountain View, CA (US)

( * ) Notice: Subject to any disclaimer, the term of this patent is extended or adjusted under 35 U.S.C. 154(b) by 885 days.

(21) Appl. No.: 11/088,542

(22) Filed: Mar. 23, 2005

(65) Prior Publication Data

US 2005/0270299 A1    Dec. 8, 2005

Related U.S. Application Data

(63) Continuation-in-part of application No. 11/051,534, filed on Feb. 5, 2005.

(60) Provisional application No. 60/650,840, filed on Feb. 7, 2005, provisional application No. 60/567,946, filed on May 3, 2004, provisional application No. 60/555,501, filed on Mar. 23, 2004.

(51) Int. Cl.
*G01C 21/30* (2006.01)
(52) U.S. Cl. .................. 701/208; 340/995.14
(58) Field of Classification Search ......... 701/207–213; 345/630, 422, 426, 473, 474, 418, 432, 424, 345/425, 427, 582, 583; 340/995.1–995.28
See application file for complete search history.

(56) References Cited

U.S. PATENT DOCUMENTS

| | | |
|---|---|---|
| 5,051,928 A | 9/1991 | Gruters |
| 5,559,707 A | 9/1996 | DeLorme et al. |
| 5,613,051 A | 3/1997 | Iodice et al. |
| 5,646,751 A | 7/1997 | Motamed et al. |
| 5,760,783 A | 6/1998 | Migdal et al. |
| 5,802,492 A | 9/1998 | DeLorme et al. |
| 5,910,805 A | 6/1999 | Hickey et al. |
| 6,002,809 A | 12/1999 | Feig et al. |
| 6,031,963 A | 2/2000 | Kitamura et al. |
| 6,054,990 A | 4/2000 | Tran |

(Continued)

FOREIGN PATENT DOCUMENTS

CA    2169421    11/1996

(Continued)

OTHER PUBLICATIONS

Canadian Office Action, Canadian Patent Application No. 2,560,386, Oct. 29, 2007, 3 pages.

(Continued)

*Primary Examiner*—Richard M. Camby
(74) *Attorney, Agent, or Firm*—Fenwick & West LLP

(57) ABSTRACT

Digital tile-based mapping techniques are disclosed that enable efficient online serving of aesthetically pleasing maps. In one particular embodiment, an image tile-based digital mapping system is configured for generating map tiles during an offline session, and serving selected sets of those tiles to a client when requested. Also provided are solutions for handling map labels and other such features in a tile-based mapping system, such as when a map label crosses map tile boundaries. Various processing environments (e.g., servers or other computing devices) can be employed in the system.

43 Claims, 8 Drawing Sheets

U.S. PATENT DOCUMENTS

| | | | |
|---|---|---|---|
| 6,100,897 | A | 8/2000 | Mayer et al. |
| 6,111,583 | A | 8/2000 | Yaron et al. |
| 6,144,338 | A | 11/2000 | Davies |
| 6,202,026 | B1 | 3/2001 | Nimura et al. |
| 6,247,019 | B1 | 6/2001 | Davies |
| 6,252,608 | B1 | 6/2001 | Snyder et al. |
| 6,262,741 | B1 | 7/2001 | Davies |
| 6,307,573 | B1 | 10/2001 | Barros |
| 6,321,158 | B1 | 11/2001 | DeLorme et al. |
| 6,346,938 | B1 | 2/2002 | Chan et al. |
| 6,388,684 | B1 | 5/2002 | Iwamura et al. |
| 6,421,053 | B1 * | 7/2002 | Johns et al. ............... 345/441 |
| 6,473,691 | B1 | 10/2002 | Winter et al. |
| 6,496,189 | B1 | 12/2002 | Yaron et al. |
| 6,538,656 | B1 * | 3/2003 | Cheung et al. ............. 345/519 |
| 6,573,905 | B1 * | 6/2003 | MacInnis et al. ........... 345/629 |
| 6,724,382 | B2 | 4/2004 | Kenyon et al. |
| 7,050,068 | B1 | 5/2006 | Bastos et al. |
| 7,081,902 | B1 | 7/2006 | Crow et al. |
| 7,222,306 | B2 | 5/2007 | Kaasila et al. |
| 2002/0067353 | A1 | 6/2002 | Kenyon et al. |
| 2002/0067374 | A1 | 6/2002 | Kenyon |
| 2002/0067379 | A1 | 6/2002 | Kenyon et al. |
| 2002/0163654 | A1 | 11/2002 | Levantovsky |
| 2003/0095135 | A1 | 5/2003 | Kaasila et al. |
| 2004/0075660 | A1 | 4/2004 | Liao et al. |
| 2004/0145599 | A1 | 7/2004 | Taoka et al. |
| 2005/0122294 | A1 | 6/2005 | Ben-David et al. |
| 2005/0270311 | A1 | 12/2005 | Rasmussen et al. |
| 2005/0286493 | A1 | 12/2005 | Angelhag |
| 2006/0017562 | A1 | 1/2006 | Bachelder |
| 2006/0041375 | A1 | 2/2006 | Witmer et al. |
| 2006/0075442 | A1 | 4/2006 | Meadow |
| 2006/0200383 | A1 | 9/2006 | Arutunian et al. |
| 2006/0241859 | A1 | 10/2006 | Kimchi et al. |
| 2006/0271286 | A1 | 11/2006 | Rosenberg |
| 2007/0011145 | A1 | 1/2007 | Snyder |
| 2007/0154067 | A1 | 7/2007 | Laumeyer et al. |
| 2007/0198182 | A1 | 8/2007 | Singh |

OTHER PUBLICATIONS

Indian Office Action, Indian Patent Application No. 1237/MUMNP/2006, Nov. 13, 2007, 2 pages.

Indian Office Action, Indian Patent Application No. 1247/MUMNP/2006, Nov. 8, 2007, 2 pages.

PCT International Search Report and Written Opinion, PCT/US06/49400, Feb. 12, 2008, 9 pages.

PCT International Search Report and Written Opinion, PCT/US06/26745, Nov. 21, 2007, 7 pages.

PCT International Search Report and Written Opinion, PCT/US05/09538, Sep. 20, 2007, 7 pages.

Canadian Office Action, Canadian Application No. 2,560,560, Feb. 5, 2008, 3 pages.

Cosman, M., "Global Terrain Texture: Lowering the Cost," Proceedings of the 1994 Image VII Conference, Tempe, Arizona: The Image Society, pp. 53-64.

"ESRI Video Clips, What is GIS?" Jul. 25, 2006, [online] [Retrieved on Jul. 25, 2006] Retrieved from the Internet<URL:http://gis.esri.com/esriclips/clip.cfm?ClipID=60>.

Gleicher, M. et al., "Through-the-Lens Camera Control," Computer Graphics, Proceedings SIGGRAPH '92, Jul. 1992, pp. 331-340, vol. 26, No. 2, [online] [Retrieved on Jul. 25, 2006] Retrieved from the Internet<URL:http://www.cs.wisc.edu/graphics/Papers/Gleicher/CMU/camera.pdf>.

LeClerc et al., "TerraVision: A Terrain Visualization System," SRI International, Menlo Park, California, Tech. Note No. 540, Apr. 22, 1994.

MapQuest.Com Maps, Directions and More, [online], [retrieved on Aug. 1, 2005]. Retrieved from the Internet <URL: http://www.mapquest.com>.

Yahoo! Maps, Driving Directions, and Traffic, [online], [retrieved on Aug. 1, 2005]. Retrieved from the Internet <URL: http://maps.yahoo.com>.

MultiMap.com—Online Maps Everywhere, [online], [retrieved on Aug. 1, 2005]. Retrieved from the Internet <URL: http://multimaps.com>.

whereis.com—Search Australian Maps, [online], [retrieved on Aug. 1, 2005]. Retrieved from the Internet <URL: http://www.whereis.com/whereis/home.jsp>.

TerraServer-USA, [online], [retrieved on Aug. 1, 2008]. Retrieved from the Internet <URL: http://terraserver.homeadvisor.msn.com/>.

NASA World Wind, [online], [retrieved on Aug. 1, 2005]. Retrieved from the Internet <URL: http://worldwind.arc.nasa.gov/>, pp. 1-2.

MSN Maps & Directions, [online], [retrieved on Aug. 1, 2005]. Retrieved from the Internet <URL: <http://maps.msn.com/(ogxuearj4ya5au55fogcdzbt/Home.aspx>.

Dragan, Richard V., MSN Virtual Earth 1.0, MSN Virtual Earth 1.0 review by PC Magazine, Jul. 26, 2005, [online], [retrieved on Aug. 1, 2005]. Retrieved from the Internet <URL: http://www.pcmag.com/article2/0,1895,1840750,00.asp>, pp. 1-2.

Montalbano, Elizabeth, Microsoft Takes on Google with Virtual Earth, IDG News Service, Jul. 25, 2005, [online], [retrieved on Aug. 1, 2005]. Retrieved from the Internet <URL: http://www.infoworld.com/article/05/07/25/HNmsvirtualearth_1.html>.

MSN Virtual Earth To Take On Google Earth, [online], [retrieved on Aug. 1, 2005]. Retrieved from the Internet <URL: http://blog.searchenginewatch.com/blog/050523-125208>, pp. 1-4.

Crawford, Clayton, et al., Fast 3D Visualization of Large Image Datasets in a GIS, Earth Observation Magazine, vol. 12, No. 9, Dec. 2003, USA, pp. 1-5.

MSN Virtual Earth—Microsoft Internet Explorer, [online], [retrieved on Aug. 1, 2005]. Retrieved from the Internet URL:http://virtualearth.msn.com, pp. 1-3.

Ho, T. K., et al., "Word Recognition with Multi-Level Contextual Knowledge," Center for Document Analysis and Recognition, State University of New York at Buffalo, pp. 1-11, Buffalo, New York.

Rabinovich, B., et al., "Visualization of Large Terrains in Resource-Limited Computing Environments," Proceedings of the $8^{th}$ IEEE Visualization '97 Conference, Oct. 19-24, 1997, pp. 95-102, Phoenix, Arizona.

Supplemental European Search Report, European Patent Application No. 05726046.5, Nov. 6, 2008, 3 Pages.

Barclay, T., et al., "The Microsoft TerraServer," Microsoft Research, Microsoft Corporation, Jun. 1998.

Potmesil, M., "Maps Alive: Viewing Geospatial Information on the WWW," [online] [Retrieved on Feb. 19, 2009] Retrieved from the internet: <URL:http://geckil.com/~harvest/www6/Technical/Paper130/Paper130...>.

Samet, H., "MARCO: MAp Retrieved by Content," IEEE Transactions on Pattern Analysis and Machine Intelligence, Aug. 1996, pp. 783-798, vol. 18, No. 8.

* cited by examiner

GENERATING AND SERVING TILES IN A DIGITAL MAPPING SYSTEM

RELATED APPLICATIONS

This application claims the benefit of U.S. Provisional Application Nos. 60/650,840, filed Feb. 7, 2005, 60/567,946, filed May 3, 2004, and 60/555,501, filed Mar. 23, 2004. In addition, this application is a continuation-in-part of U.S. application Ser. No. 11/051,534, filed Feb. 5, 2005, titled "A Digital Mapping System." In addition, this application is related to U.S. application Ser. No.11/088,677, filed Mar. 23, 2005, titled "Generating, Storing, and Displaying Graphics Using Sub-Pixel Bitmaps." Each of these applications is herein incorporated in its entirety by reference.

FIELD OF THE INVENTION

The invention relates to mapping systems, and more particularly, to mapping systems in a digital environment.

BACKGROUND OF THE INVENTION

Computerized mapping systems have been developed to search for, identify, and discover information about geographic locations. One form of such computerized mapping systems includes travel-planning Internet websites. With an excess of 50 million unique monthly users, such map sites are a very popular offering. Examples of such sites include AOL's MapQuest, Yahoo's Telcontar-based maps, and Microsoft's MapPoint.net suite. Such sites all work along the lines of a common model, as will now be described.

When a Web user asks for a new map view (e.g., by entering a postal address, or by clicking a navigation link next to a current map view), the user's Web browser sends to a Web server a request indicating the boundaries of the new map view. The Web server in turn extracts the corresponding vector-based map data from a database, and draws a bitmap image of the map. The server then converts the bitmap to an image format supported by the user's Web browser and returns the image, sometimes embedded in HTML, to the user's Web browser so that it can be displayed.

Other map Web sites, such as Britain's MultiMaps or Australia's WhereIs utilize a raster-based map database instead. In these cases, it is not necessary to extract vectors and draw a map image. Rather, these functions are replaced by simply extracting the appropriate part of a larger, pre-rendered image.

Whether vector-based or raster-based, these existing systems typically exhibit very poor performance. In particular, the resulting maps tend to be small and move slowly. Consider, for example, the simple task of panning an existing map view west by, say, 50% of the width of the view. Conventional systems typically produce an entirely new image and transmit the new image from the server to the user's browser. Such systems are wasteful, as they fail to recognize and exploit the 50% overlap between the new and old map views. In the vector-based case, the addition need to produce a map image from vectors in real-time tends to result in maps that are generally hard to read and lack a professional look and feel, thereby detracting from the user experience.

Other vendors have chosen to write custom software for their users to download and install. While this latter approach can result in a dramatic improvement in the user experience, the need to install software on a user's computer may prevent its widespread adoption.

What is needed, therefore, are digital mapping techniques that facilitate the efficient online delivery of aesthetically pleasing maps.

SUMMARY OF THE INVENTION

One embodiment of the present invention provides a system for generating map tiles for a tile-based digital mapping system. The system includes a map painter module for generating digital map images, a tile maker for generating map tiles from the digital map images and a tile storage for storing map tiles generated by the tile maker. In one such embodiment, the map painter module is operable to request and receive geographical data for a given area from which the digital map images are generated. Here, a map data storage can be used for storing one or more sets of the geographical data for a given area that is accessible by the map painter module. The map data storage may include, for example, a set of rich mapping format (RMF) files. In one particular configuration, a remote mapping engine (RME) library has an application program interface that allows the map painter module to access the geographical data.

The tile maker may operate, for example, according to a configuration file that defines areas and zoom levels for which map tiles should be generated. The configuration file may further define at least one of geographical data sets to use, and how the map should be drawn including label placement information. The tile maker can use the map painter module to generate the digital map images for areas defined in the configuration file. In one particular embodiment, the tile maker is adapted to divide large areas defined in the configuration file into smaller areas, and uses the map painter module to generate the digital map images for those smaller areas. The tile maker may be further configured to encode the generated map tiles into a desired image format (e.g., sub-pixel bitmaps, GIF, PNG, TIFF, or JPEG), and to store the formatted map tiles. The system may further include a map tile serving system configured to serve map tiles stored in the tile storage, in response to map requests from a user.

Another embodiment of the present invention provides a map tile serving system configured to serve map tiles in response to map requests from a user. The system includes a plurality of front end tile servers for serving one or more map tiles requested by a user. A request distributor is used for distributing requests for map tiles between the plurality of front end tile servers. Also included in the system is a plurality of back end tile servers communicatively coupled with the plurality of front end tile servers. Each back end tile server has access to the map tiles (e.g., either locally on a disk or over a network), and is configured to provide requested map tiles to a corresponding front end tile server.

At least one of the front end tile servers can be configured to identify one or more uni-colored map tiles, and is configured to serve the uni-colored map tiles, without having to request those uni-colored map tiles from one of the back end tile servers. In one such embodiment, the one or more uni-colored map tiles are stored in a memory cache included in the at least one front end tile server, thereby reducing the need for disk access associated with serving those uni-colored map tiles. In another such embodiment, the user is communicating with the at least one front end server using a computing device, and the at least one front end server causes the computing device to use uni-color map tiles that are locally available to the computing device, so that such tiles do not have to be served.

Each of the map tiles can be associated, for example, with an N×N block of map tiles, and each time a map tile is requested, all $N^2$ tiles in the corresponding N×N block can be served. All of the $N^2$ tiles can be cached as well. In other embodiments, the map tiles can be associated, for example, with an N×M block of map tiles (i.e., the block need not be square). The number of back end servers can be such, that each back end server can be used to serve a particular sub-set of the map tiles. Here, each back end server can be capable of caching all or parts of its corresponding sub-set. Each back end tile server can be dedicated to serving a sub-set of the map tiles, and each front end tile server can be configured to identify an appropriate back end server to use in satisfying a user request for a map tile. In one such embodiment, each front end tile server uses a hashing function based on map tile coordinates to identify the appropriate back end server. Note that the back end tile servers do not need to know which sub-set they are serving, which can simplify deployment.

In response to a back end tile server being unavailable to serve its load of map tiles, each front end tile server can be configured to distribute that load among the remaining back end tile servers. In one such embodiment, each front end tile server uses a hashing function based on map tile coordinates and an attempt counter to distribute the load. The system may further include a map tile generation system including a tile maker, for generating the map tiles. A tile storage for storing the generated map tiles can also be provided, wherein map tiles that are not available in caches of the front end and/or back end servers can be accessed from the tile storage.

Another embodiment of the present invention provides a tile-based digital mapping method. The method includes generating map tiles from digital map images, storing the map tiles, and serving one or more of the map tiles, in response to a user map request. The method may further include identifying uni-color map tiles that are locally available to a computing device of the user. The method may further include generating the digital map images, which includes defining areas and zoom levels for which map tiles should be generated. Generating the digital map images may include, for example, defining at least one of geographical data sets to use, and how the map should be drawn including label placement information. Storing the map tiles may include encoding the generated map tiles into a desired image format, and storing the formatted map tiles. Serving one or more of the map tiles may include caching the served map tiles.

In one particular embodiment, generating map tiles from digital map images may include: identifying areas to be drawn, and various zoom levels at which the area needs to be drawn; dividing the areas into sub-areas as needed at the different zoom levels, such that each sub-area can be pre-rendered in an available memory; pre-rendering each sub-area at a given zoom level; dividing each pre-rendered sub-area into rendering areas, such that each rendering can be rendered in the available memory; and rendering the rendering areas, and cutting the resulting image into map tiles. In one such case, each of the sub-areas at a zoom level represents a task, so as to provide a list of tasks defined by area and zoom level, and parallel processing is applied to executing these tasks. In another such case, the map to be displayed to the requesting user has a resolution, and the rendering is done at a resolution N times greater than the resolution of the map to be displayed (e.g., $N>=2$), and the bitmap produced by the rendering is used as input for generating tiles as sub-pixel bitmaps.

Another embodiment of the present invention provides a method for generating digital map tiles from digital map data. The method includes identifying areas to be drawn, and various zoom levels at which each area needs to be drawn. The method continues with dividing the areas into sub-areas as needed at the different zoom levels, such that each sub-area can be pre-rendered in an available memory. The method continues with pre-rendering each sub-area at a given zoom level, and then dividing each pre-rendered sub-area into rendering areas, such that each rendering area can be rendered in the available memory. The method continues with rendering the rendering areas to produce an image, and dividing the image into map tiles. The pre-rendering each sub-area may include, for example, accessing at least one of geographical data sets and a representation of instructions about how to build the digital map image. The instructions can be represented, for instance, in a configuration file. The sub-areas can each have a pre-determined fixed size for each zoom level. In one particular embodiment, pre-rendering decisions prevent problematic features from crossing borders between sub-areas. Alternatively, in another embodiment, pre-rendering decisions allow features to cross borders between sub-areas. In such a case, two aligning sub-areas associated with a border crossing feature are not allowed to be pre-rendered at the same time. Pre-rendering decisions can be stored so they can be used in subsequent pre-rendering tasks (which enables features to cross borders between sub-areas).

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

Digital tile-based mapping techniques are disclosed that enable efficient online serving of aesthetically pleasing maps. In one particular embodiment, an image tile-based digital mapping system is configured for generating map tiles during an offline session, and serving selected sets of those tiles to a client when requested. Also provided are solutions for handling map labels and other such features in a tile-based mapping system, such as for example when a map label or other feature crosses map tile boundaries. Various processing environments (e.g., servers or other computing devices) can be employed in the system.

The functionality described herein may be implemented by computer program instructions. These instructions can be loaded into a computer or other processing environment to produce a machine, such that the instructions are executed to carry out tile-based mapping techniques in accordance with various embodiments of the present invention. These computer program instructions may also be encoded in a processor-readable medium so as to provide an article of manufacture. Any number of programming languages or combination thereof (e.g., C, C++, HTML) can be used to implement the computer program instructions. Other embodiments of the present invention can be implemented by purpose-built hardware, such as field programmable gate array (FPGA) or application specific integrated circuits (ASIC) technology. Likewise, combinations of hardware and software can be used to carry out other embodiments of the present invention, as will be apparent in light of this disclosure.

System Overview

Figure 1:
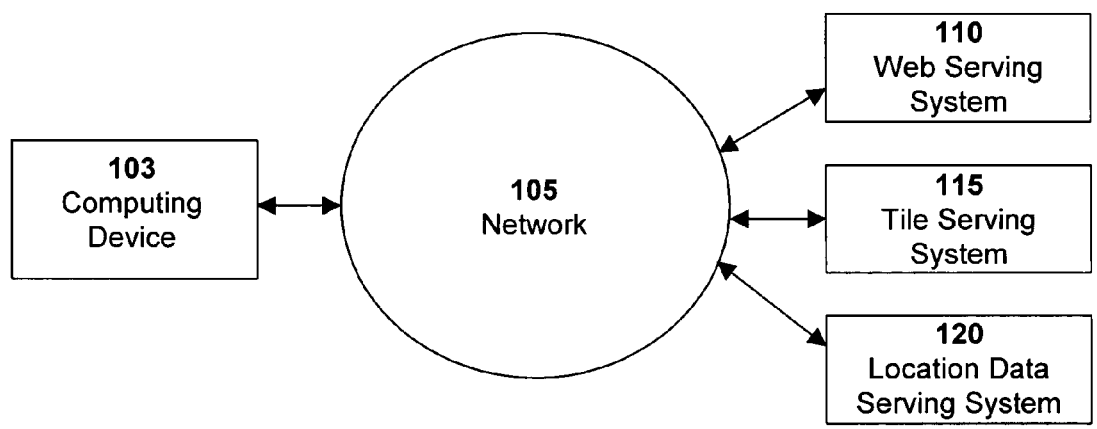
FIG. 1 is a block diagram of a tile-based digital mapping system configured in accordance with one embodiment of the present invention.

FIG. 1 is a block diagram of a tile-based digital mapping system configured in accordance with one embodiment of the present invention. As can be seen, the system includes a computing device 103 connected to a network 105. Various serving systems are also connected to the network 105, including a web serving system 110, a tile serving system 115, and a location data serving system 120. Other computing devices 103 (not shown) may also be in communication with the serving systems 110, 115, and 120 via the network 105.

The computing device 103 may be any type of device configured for computing, such as a personal computer or laptop, a mobile phone, a personal digital assistant, a navigation system located in a vehicle, a handheld GPS system, and so on. The computing device 103 includes a browser (or other similar application) that allows the user to interface and communicate with other devices and systems on the network 105. Examples of browsers include Microsoft's Internet Explorer browser, Netscape's Navigator browser, Mozilla's Firefox browser, PalmSource's Web Browser, or any other browsing or application software capable of communicating with network 105. Generally stated, the computing device 103 can be any device that allows a user to access the serving systems 110, 115, and 120 via the network 105.

The web serving system 110 is the part of the overall system that delivers the initial HTML (hypertext markup language), images, scripting language (e.g., JavaScript, JScript, Visual Basic Script), XSLT (extensible stylesheet language transformation), and other static elements that are used by the browser on computing device 103. Note that this serving system 110 may include one or more servers operating under a load balancing scheme, with each server (or a combination of servers) configured to respond to and interact with the computing device 103. The web serving system 110 can be implemented with conventional technology, as will be apparent in light of this disclosure.

The tile serving system 115 is the part of the overall system responsible for delivering individual map tiles in response to requests from the computing device 103, with each tile being uniquely defined, for example, by x, y and z values that coordinates to an overall tile-based map. Other tile identification schemes can be used as well. The serving system 115 may include one or more servers operating under a load balancing scheme, with each server (or a combination of servers) configured to respond to and interact with the computing device 103. Example architecture and functionality associated with the tile serving system 115 will be further discussed with reference to FIG. 8.

The location data serving system 120 is the part of the overall system that delivers location data of various forms to the computing device 103. Its functions include, for example, finding the geographic location of a street address, generating and formatting driving directions, and searching for location-specific results to a query (e.g., as with the Google Local Search service). Other services may also be provided. In general, when the user enters a search string, it is put into a request by the computing device 103, and sent to the location data serving system 120 via the network 105. The location data serving system 120 then determines what the request is for, and responds with the appropriate data from various sub-systems, such as geo-coders, routing engines, and local search indexes, in a format that computing device 103 can use to present the data to the user (e.g., via a browser).

The network 105 may be any type of communications network, such as a local area network (e.g., intranet), wide area network (e.g., internet), or some combination thereof. Alternatively, the network 105 may be a direct connection between the computing device 103 and the serving systems 110, 115, and 120. In general, the computing device 103, network 105, and/or serving systems 110, 115, and 120 may be in communication via any type of wired or wireless connection, using a wide variety of communication protocols.

Figure 2:
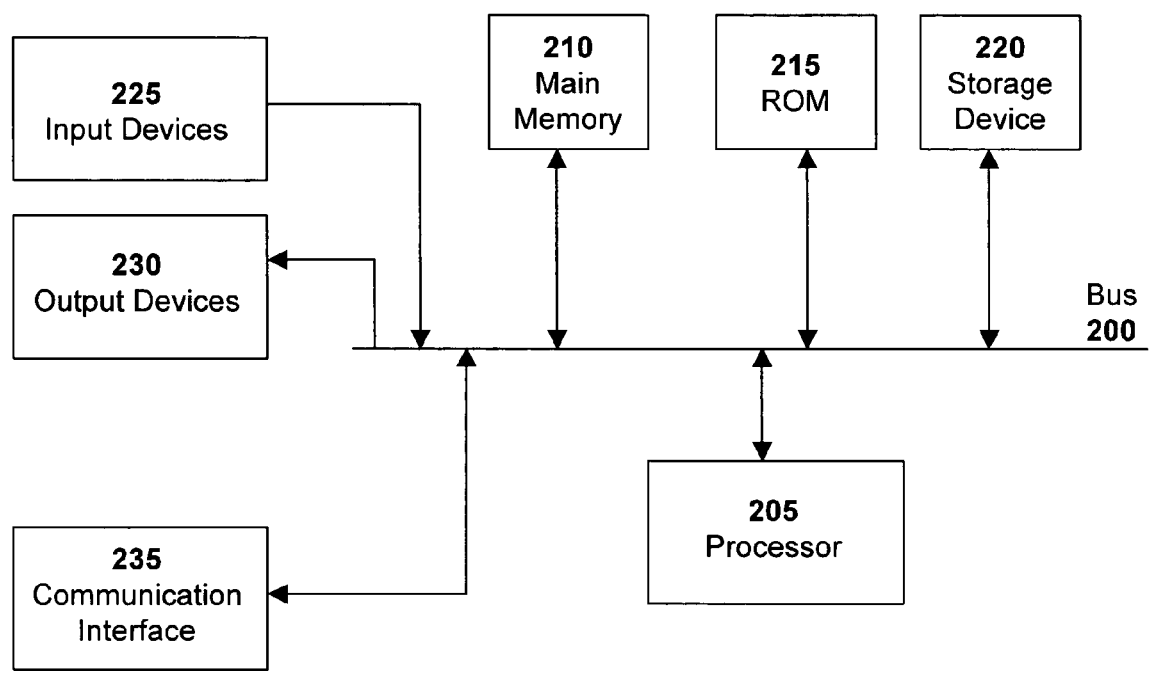
FIG. 2 is a block diagram of a processing environment that can be employed in the system of FIG. 1.

FIG. 2 is a block diagram of a processing environment that can be employed in the system of FIG. 1. For instance, computing device 103, or any servers included in the serving systems 110, 115, and 120 can be configured using the illustrated processing environment. Numerous other processing environments can be used as well, and the present invention is not intended to be limited to any one such embodiment—FIG. 2 is merely provided as one possible example.

As can be seen, this example processing environment includes a bus 200, one or more processors 205, a main memory 210, a read-only memory (ROM) 215, a storage device 220, one or more input devices 225, one or more output devices 230, and a communication interface 235. Bus 200 may include one or more conductors that permit communication among the components of the processing environment, and can be implemented using conventional bus technology.

Processor 205 may include any type of conventional processor, microprocessor, or processing logic that interprets and executes instructions. Main memory 210 may include a random-access memory (RAM) or another type of dynamic storage device that stores information and instructions for execution by processor 205. ROM 215 may include a conventional ROM device or another type of nonvolatile storage device that stores information and instructions for use by processor 205. Storage device 220 may include, for example, a magnetic and/or optical recording medium and its corresponding drive. Note that the main memory 210 may also include a cache memory for temporarily storing commonly accessed data (e.g., map tiles). Such a cache will eliminate the need for accessing the storage device 220 each time a request for data is received, thereby reducing process times.

Input device 225 may include one or more conventional mechanisms that permit a user to input information to the processing environment, such as a keyboard, a mouse, a pen, a stylus, handwriting recognition, voice recognition, biometric mechanisms, and the like. Output device 230 may include one or more conventional mechanisms that output information to the user, such as a display, printer, speakers, and the like. Communication interface 235 may include any transceiver-like mechanism that enables the processing environment to communicate with other devices and/or systems. For example, communication interface 235 may include a modem (e.g., 56K, DSL, or cable) for communicating with another device or system via network 105.

In the operation of one embodiment, the computing device 103 requests map information that is stored in the tile serving system 115. A front-end server (included in tile serving system 115) responds to queries submitted by the computing device 103 or "client-side" by returning a web page that contains instructions (e.g., in JavaScript or another scripting language) accessed by the client-side browser. In this way, the client computing device 103 requests map tiles as needed from the tile serving system 115, which serves the tiles associated with the requested map image. The requested map image is then displayed at the computing device 103, by combining together in the web browser the set of tiles that form the requested map image. The map tiles can be "pre-rendered" meaning that they are produced during an off-line phase that will be discussed with reference to FIG. 3.

To reproduce any sub-area view of the large raster image as a map image on a user's web browser, a browser-side script can be used that uses only the smallest set of tiles that together covers the desired view. Thus, the user can view a served section of map, and then change the section of map being viewed (e.g., by dragging the map in one direction using the cursor of input device 225), thereby causing new map tiles to be served that fill in the new map locations now within the browser window. The effect is a virtually endless map that can be zoomed in/out and further adjusted to new locations as desired. This feature as well as others that are enabled by a tile-based digital mapping system configured in accordance with an embodiment of the present invention are further discussed in detail in the previously incorporated parent application, titled "A Digital Mapping System." For any given implementation, the size of the tiles can be determined heuristically, given the following trade-off: (1) larger tiles tend to increase the total size (in both pixels and bytes) of the tiles needed to produce a given view; while (2) smaller tiles tend to increase the number of separate requests (e.g., HTTP requests) needed to produce a given view.

Alternatively, rather than using a database of tiles on the server side (e.g., tile serving system 115), each tile can be stored in a separate file, accessible using unique URLs such as: http://<domain>/7/−18/1/−145__12__7.gif, where the directory path 7/−18/1 in this example depends solely on the tile coordinates, which in this case are equal to (−145, 12, 7). For simplicity, the first tile of each zoom-level z can be located such that the tile's upper-left pixel has coordinates (0, 0, z). This setup facilitates assignment of a unique coordinate triplet to each tile by integer-dividing the pixel x and y coordinates of the tile's upper-left pixel by the width and height of the tile, respectively. Note that in some embodiments, a total of three coordinate systems are thus utilized: latitude/longitude coordinates, pixel (x, y, z) coordinates, and tile (x, y, z) coordinates. This particular choice of coordinate systems is not intended to limit the present invention, and was chosen to aid in describing the algorithms used in some embodiments. In general, any consistent coordinate or indexing system can be used here. In turn, each pixel belongs to a unique tile, the coordinates of which can be easily computed.

In one embodiment, the zoom levels are numbered 0 thru Z, where 0 represents the level closest to street level, and Z the level that is furthest away from street level. An arbitrary latitude/longitude point within the area of interest is designated and defined as the origin, or origo (such as the geographic center of the contiguous United States). Then, at each zoom level z, the coordinate triplet (0, 0, z) is assigned to the pixel of the z-level raster image containing this origin. Using the standard computer graphics convention that x-axis coordinates grow left-to-right, and y-axis coordinates grow up-to-down, a unique coordinate triplet (x, y, z) is assigned to each pixel of each of the raster images.

A coordinate conversion routine, given a zoom-level z, converts a latitude/longitude coordinate pair to the appropriate (x, y, z) pixel coordinate, and vice versa. The details of this conversion depend on the map projection that was used in producing the raster images in the first instance.

Tile Generation

Figure 3:
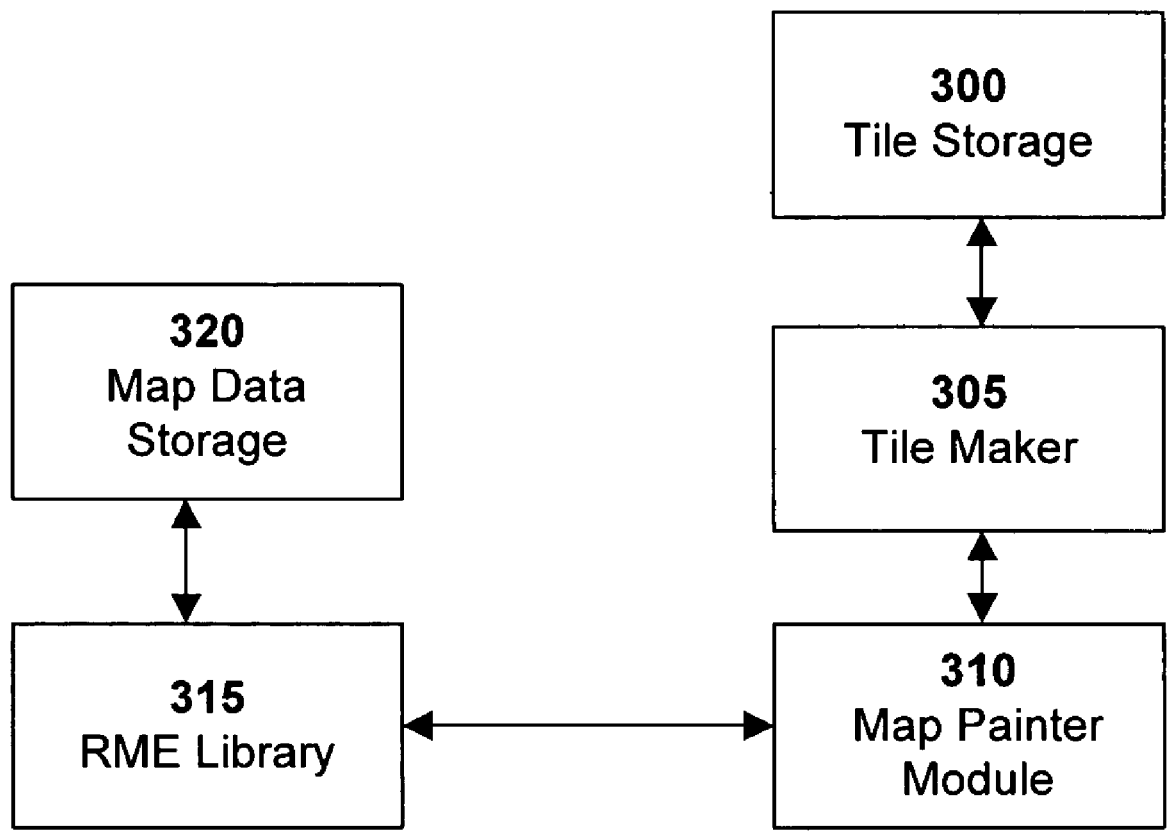
FIG. 3 is a block diagram of a system configured for generating map tiles for a digital mapping system in accordance with one embodiment of the present invention.

FIG. 3 is a block diagram of a system configured for generating map tiles for a digital mapping system in accordance with one embodiment of the present invention.

As mentioned earlier, a set of large, contiguous, pre-rendered raster images of the entire area covered by the map system can be generated in an off-line process that is transparent to the user. One such set of raster images is provided for each zoom-level, ranging, for example, from street level to country level. These larger images are then cut into tiles, which are then encoded into an appropriate image format (e.g., GIF). The purpose of the system shown in FIG. 3 is to generate a complete set of tiles, covering a given set of areas and zoom levels.

In general, the process of generating a map image from which map tiles can be made can be divided into two logic processes: pre-rendering and rendering. In the pre-rendering process, decisions about how the map should be drawn are made based on the available map data and configuration data. In the rendering process, the actual map drawing takes place, either by generating a bitmap image or by defining the map drawing in a vector-based format. For both processes, speed is highly desirable. Carrying out the processes in the memory of a computational device or other suitable processing environment is one way of achieving sufficient speed.

In one embodiment, the pre-rendering process has access to all the needed map data (geographical data sets from which map images can be drawn), and a representation of the decision about how to build the map in memory. This decision can be represented, for example, in a configuration file. The rendering process may keep the bitmap being drawn in memory, together with the definitions of what is to be drawn. In some (but not all) cases, the pre-rendering process can cover a much larger area than the rendering process in relation to the amount of memory available.

For example, to cover the entire continental United States and Canada, hundreds of millions of tiles may be needed, with a total file size for the tiles in the order of hundreds of gigabytes of data. Instead of drawing a map image from the underlying data on demand, the entire map is pre-drawn in sections (tiles), and the appropriate tiles are sent to the client when they are needed. Each tile-based map image that is eventually assembled and displayed on a user's web browser matches a sub-area (typically shaped as a rectangle) of one of the larger pre-determined raster images. Tile generation for large areas is discussed herein.

The tile generation process is initiated by executing the tile maker 305. To draw areas, the tile maker 305 uses the map painter module 310 to generate the images. The map painter module 310 gets the geographical data for a given area through a commercially available RME (remote mapping engine) library 315, which employs an application program interface (API) that allows the map painter module 310 to access the map data storage 320. Note that in alternative embodiments, the map painter module 310 can be configured to directly access the map data storage 320, thereby eliminating the need for the commercial RME library 315. In any case, the map painter module 310 operates as a drawing module, where a graphics library can be used to generate bitmaps with the desired appearance. In order to have a bitmap map image be anti-aliased, this can be done by the graphics library or by drawing the map image at a higher resolution than is desired, and then either scaling the image down with an appropriate method (such as bilinear or bicubic resampling), or by using the higher resolution bitmap as the input to software capable of generating sub-pixel bitmaps. One particular such embodiment draws a map image using Microsoft's GDI/GDI+ at 4 times the resolution, and then generates sub-pixel bitmaps by converting each 512×512 pixel area into one 128×128 pixel sub-pixel bitmap tile.

The tile storage 300 is where the tiles generated by the tile maker 305 are saved. In one embodiment, tile storage 300 is implemented as a simple disk based storage system, but it could be any system capable of receiving and storing large amounts of data efficiently. Since a normal file system often becomes inefficient when handling a large number of small files, the tiles can be stored in compound files. In one particular embodiment, the tiles are stored as sub-pixel bitmaps (as discussed in the previously incorporated U.S. Provisional Application No. 60/555,501), but any bitmap or vector-based format could be used instead. Once the map tiles are stored in a tile storage 300, they are available to a process that reads the tiles (e.g., in blocks or one at a time) and caches them in a manner that may be optimized with respect to the digital mapping system that serves the tiles to a requesting client.

The tile maker 305 can be started with a configuration file, which defines which areas and zoom levels the tiles should be generated for, which data sets to use, and how the map should be drawn (e.g., through a specification of colors, appearance for various features, label placement, and the like). The configuration file can also contain additional data not present in the map data storage 320, such as manually placed labels. In one embodiment, the configuration file is implemented as an extensible markup language (XML) formatted text file, containing all the configuration data the tile maker 305 needs to draw map images (using the map painter module 310). Other formats and solutions for executing the tile maker 305 could be used as well, as will be apparent in light of this disclosure.

As explained, the tile maker 305 uses the map painter module 310 to draw the map images for the areas defined in the configuration file. In one particular instance, map drawing is the process of generating a bitmap image of a target area (e.g., Midwestern United States or the city of San Francisco, or some other geographical area) from vector data defining points, lines, and areas of geographical features such as Points of Interest (POI) and addresses, features such as roads and railways, cities, parks, and the like. When an area is large, it can be impractical for the map painter module 310 to draw and store the entire drawn map image in memory, so the tile maker 305 can divide the area into smaller areas, and draw those one at a time. Tile generation for large areas is further discussed herein. Since it is desirable for the area being drawn to constitute a single continual image, this division can lead to problems, since drawing decisions with respect to different parts of the area might not align at the borders between these parts.

Figure 6:
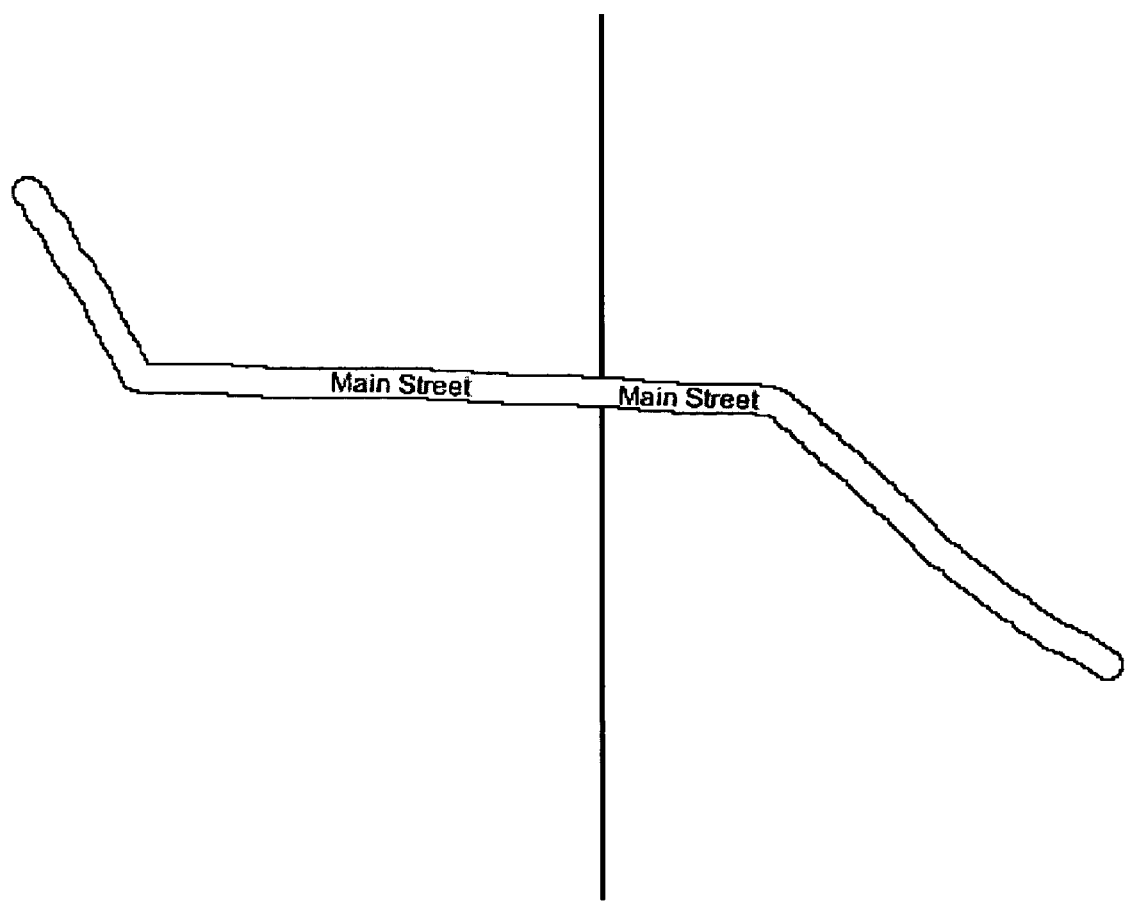
FIG. 6 illustrates a solution to the scenario shown in FIGS. 4 and 5, where a map label is not allowed to cross map tile boundaries, in accordance with an embodiment of the present invention.
Figure 7:
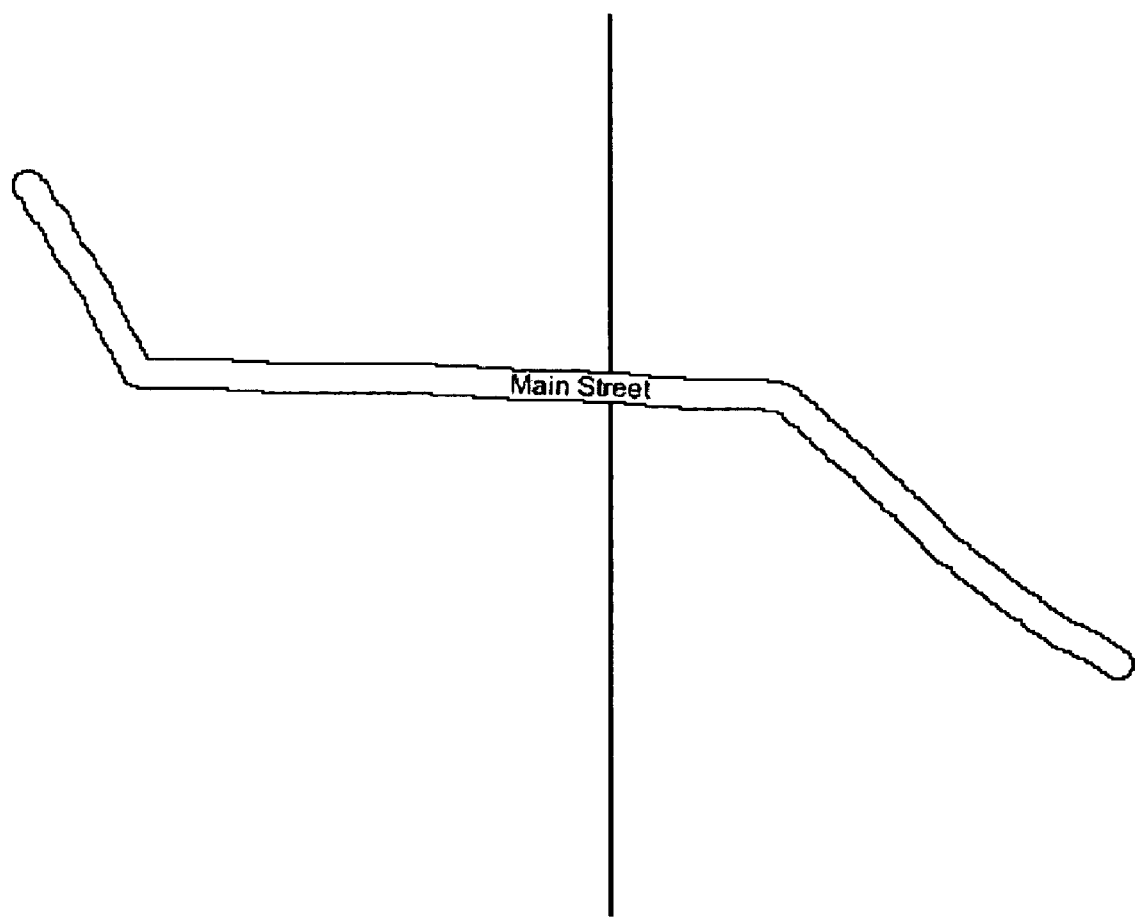
FIG. 7 illustrates another solution to the scenario shown in FIGS. 4 and 5, where a map label that crosses a map tile boundary is drawn in two parts, in accordance with an embodiment of the present invention.

One solution, which is further discussed with reference to FIG. 6, is to force labels and other problematic features to be drawn only fully inside the area currently being drawn—this solution prevents partially drawn labels, but it can decrease the quality of the map image along borders, since it limits the range of possibilities for placing such features. For instance, a road crossing such a border between two separately drawn areas could have the same label placed on both sides of the border, much closer than the labels would otherwise be placed. Another solution, which is further discussed with reference to FIG. 7, is to save the decisions for placing problematic features along borders, and then take these decisions into account when drawing subsequent areas. This can be done simply to avoid placing features in unfortunate ways on each side of a border, or it can allow features to be placed independently of borders (e.g., by allowing such features to cross borders).

To draw an area, the tile maker 305 can use the map painter module 310, and pass on to the map painter module 310 the relevant information about the area to be drawn, the desired scale, which geographical data sets to include, which features to draw and how such features should be drawn. In response, the map painter module 310 returns a corresponding digital map image, which is turned into tiles by the tile maker 305 and stored in the desired format, such as sub-pixel bitmaps (or any bitmap or vector based format), in the tile storage 300.

In one particular embodiment, a tile size of 128×128 pixels is used, with the tiles being stored in a GIF format. Other embodiments may use a tile size of 256×256 pixels, stored either in GIF, PNG, TIFF, or JPEG formats. Other tile sizes and image storage formats may also be used, depending on the requirements of each particular implementation. These tiles generally form a regular, rectangular grid, and this property facilitates system implementation in one embodiment. However, note that any other division of the large raster images into tiles of any shapes and sizes that allows for assembly on the client-side (e.g., computing device 103) may also be used to achieve the effects of the present invention.

As previously discussed, the RME library 315 is a commercially available piece of software that can be used to query data from RMF (rich mapping format) files. The RME library 315 supports spatial queries that request information involving the geographic relation of two or more items. Example queries are "What map features fall within a given area?" or "What map features fall within a given area that have a priority level higher than a certain threshold?" The result of the spatial query is used to generate map images and ultimately map tiles. RMF files are generated by compiling other map formats to RMF. The benefit of this process is that the full range of map data file formats that can be compiled into RMF files can be queried in a consistent manner through the RME library 315. Note that any combination of file formats and libraries can be used in the described system; the only requirement is that there is a service that the map painter module 310 can use to get the geographical data for a given area.

The map data storage 320 is geographical map data stored on a disk, which is accessed by the RME library 315. In one embodiment, the stored map data comprises commercially available NavTech data that has been compiled by Telcontar (a commercial provider of digital map and navigation information) into a set of RMF (Rich Map Format) files. RMF is a conventional map data format optimized for spatial query processing. Thus, once an item is found in the spatially formatted dataset, other close-by items can be found with relative ease. Note, however, that there are many other ways to organize the map data in storage 320, such as sequentially or in layers. The exact files/data sets to use can be defined by the configuration file that was used to control the execution of the tile maker 305. Any source of map data can be substituted here, and the RME library 315 and the map data storage 320 could be one system with an API that the map painter module 310 can use. Alternatively, the RME library 315 and API functionality can be integrated into the map painter module 310. Other configurations will be apparent in light of the disclosure herein.

Tile Generation for Large Areas

As previously indicated, the pre-rendering process can (in some cases) cover a much larger area than the rendering process in relation to the amount of memory available. Refinements can be made to the tile generation process carried out by the system of FIG. 3, so as to make tile generation feasible for large areas (e.g., the continental U.S. and Canada). In one embodiment, the process for generation of all the tiles defined by a configuration file proceeds as follows.

First, the tile maker 305 looks at all the areas that need to be drawn, and the various zoom levels at which they need to be drawn, and divides the areas into sub-areas as needed at the different zoom levels, such that each sub-area can be pre-rendered in a given amount of memory. The decision can be based on the actual data for a given area. Alternatively, to keep this step as short as possible, a fixed size for a sub-area can be used, or a fixed size for each zoom level. Each of the sub-areas at a zoom level becomes a task on its own, defined by area and zoom level, stored in a list, and a large number of tile makers 305 can be applied to executing these tasks (e.g., using parallel processing).

To avoid problems across the borders between these sub-areas, the pre-rendering process can assure that no problematic features cross these borders, thereby enabling each sub-area to be pre-rendered and subsequently rendered fully independently (FIG. 6). Alternatively, the decisions made during one pre-rendering process can be saved so they can be accessed in subsequent pre-rendering tasks, so that features can. cross borders between sub-areas (FIG. 7). This requires some coordination, so as to avoid having two aligning sub-areas be pre-rendered at the same time (assuming a parallel processing scheme with multiple tile makers 305 is in place).

When a tile maker 305 takes one of the tasks from the list, it pre-renders the sub-area at the zoom level defined by the task, and then divides the sub-area into rendering areas that are small enough to be rendered in the available memory. The tile maker 305 then proceeds to render one rendering area at a time, cutting the resulting image into tiles, and placing the tiles in the tile storage 300. In one particular embodiment, the rendering is done at 4 times the desired resolution, and the resulting bitmap is used as input for generating tiles as sub-pixel bitmaps, but other sizes and formats can be used depending on the desired output. Note that features such as labels can cross the borders between the rendering areas, since all decisions about their placement are done during the pre-rendering process. Note also that if the sub-areas are made small enough to be both pre-rendered and rendered in memory, there is less distance between the borders that impose restriction on the placement of features such as labels, and the resulting map is generally of lesser quality.

In addition to the already mentioned strategies for generating tiles depicting a continual map with no broken features (e.g., across tile borders), decisions about the placement of features can be made based only on map data within a certain radius, in such a way that nothing outside that radius can affect the label placement. In such a system, there may be no need to identify borders that cannot be crossed by features such as labels, as long as an area being pre-rendered and rendered can access map data beyond the sub-area (up to the radius outside the sub-area). With sufficient refinement of the pre-rendering code and a large enough radius, such a system may be able to produce results comparable in quality to the previously described methods. When labeling areas such as cities or lakes, the pre-rendering process can load the entire feature from the map data, and use only the feature to decide where to place labels. This means that the decision about placement of such labels or similar features will be the same for adjacent sub-areas, so these features can be allowed to cross borders.

Tile-Based Mapping System Issues and Solutions

The following illustrates example applications of the previously described continuity techniques, with reference to FIGS. 4 through 7.

Figure 4:
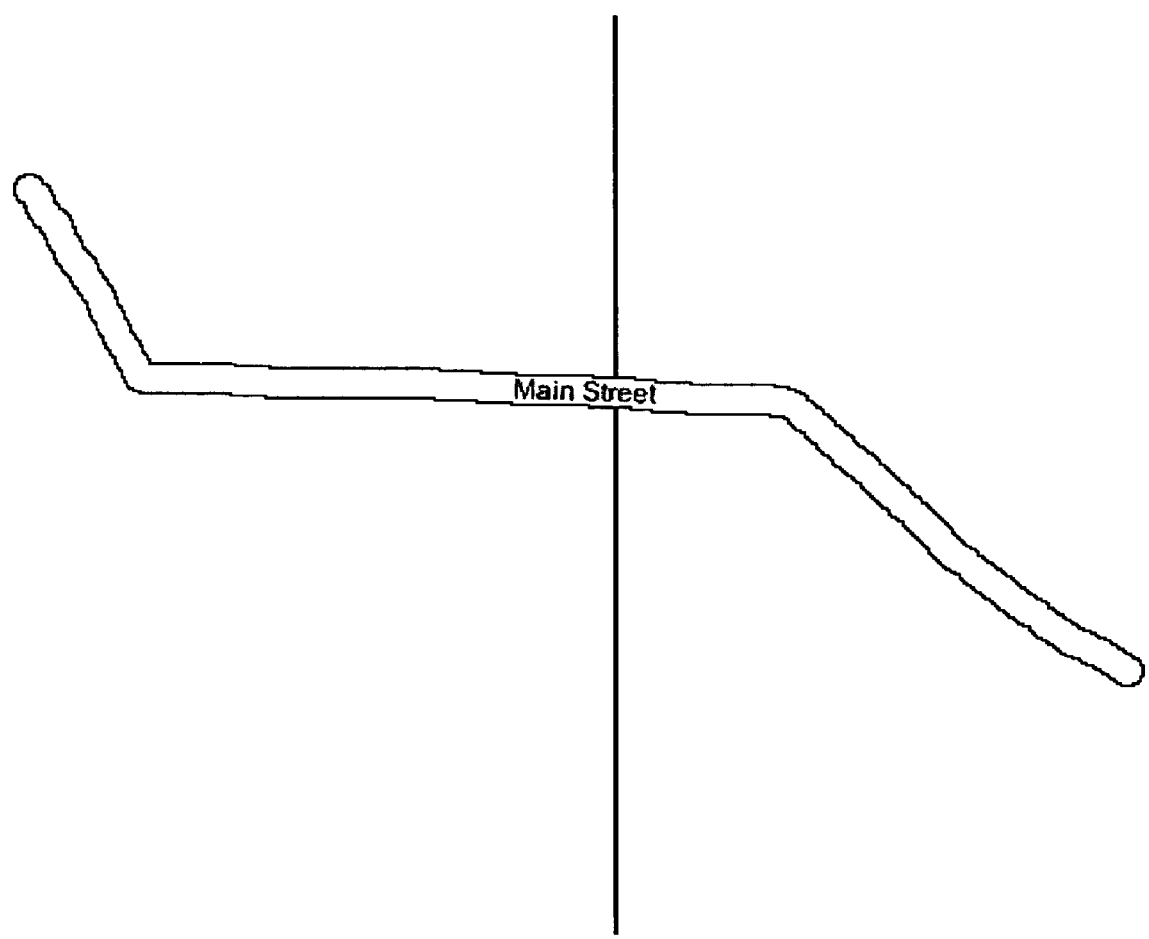
FIGS. 4 and 5 illustrate a tile-based mapping system scenario in which a map label crosses map tile boundaries.

Since mapping system embodiments may deal with large areas (e.g., on the scale of countries, continents, or even planets), having access to a full area bitmap at one time may not be practical. To address this issue, as previously explained, it may be desirable to divide the full area into smaller sub-areas, and to generate the tiles for one sub-area at a time. To do this without introducing errors into the full map image, one embodiment addresses the issue of continuity across tiles and sub-areas. FIG. 4 illustrates a typical label placement problem, where a map label ("Main Street") crosses map tile boundaries (referred to as the sub-area border), while FIG. 5 illustrates a problem that may appear when each sub-area is drawn independently.

Figure 5:
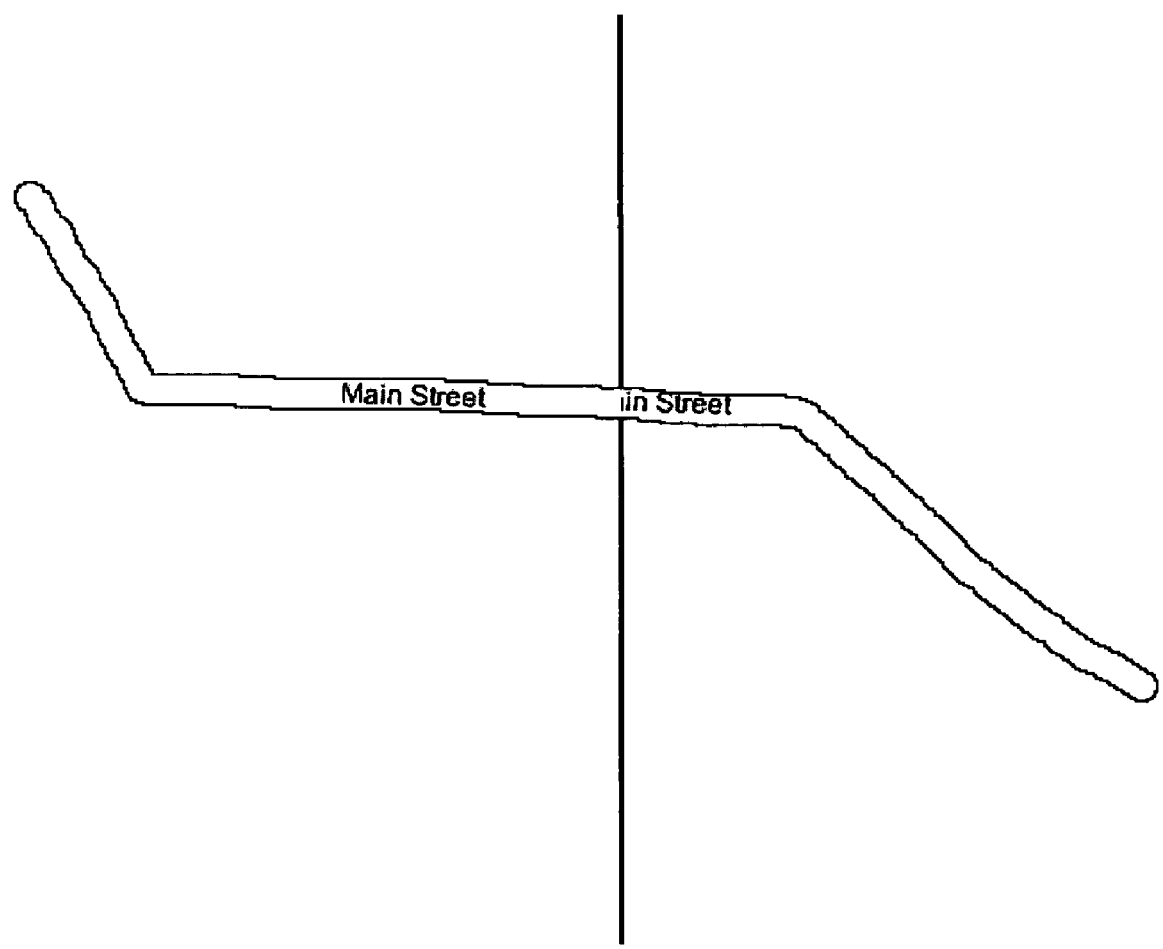

FIG. 6 illustrates a solution to the problem shown in FIGS. 4 and 5, where a map label is not allowed to cross map tile boundaries, in accordance with an embodiment of the present invention. This approach assure that features that could cause problems across borders between sub-areas are placed during the pre-rendering process so as to eliminate or otherwise reduce errors in the map.

For instance, name labels for road or railroads are placed during the pre-rendering process so they do not cross these sub-area borders, assuring that the final map doesn't have labels that are only partially there (e.g., as shown in FIG. 5). Labels for areas, such as cities or lakes, can be placed depending only on the shape of such features. This means that to place such labels, the entire feature being labeled must be retrieved, even if parts of the feature are in other sub-areas, and then the label must be placed based on the shape of the full area. In a system that seeks to minimize the appearance of overlapping labels, area labels should be placed before the labels for other features such as roads and railroads, so that these other features will not affect an area label in one sub-area, since these effects would be unknown to the drawing process drawing the map in an adjoining sub-area, and therefore the exact identical placement of the area label would no longer be guaranteed.

FIG. 7 illustrates a solution to the problem shown in FIGS. 4 and 5, where a map label that crosses a map tile boundary is drawn in two parts, in accordance with another embodiment of the present invention. This solution can be implemented by storing decisions made during the pre-rendering process for each sub-area, and making the decisions available to subsequent processes for drawing areas that contain the same features (or portions thereof), as well as adjoining areas that might move features and labels based on information about the placement of features and labels in previously drawn areas.

In such a case, the map drawing module (e.g., map-painter module 310 shown in FIG. 3) can place labels (e.g., on a road) without taking the border of the sub-area into account, since a label that crosses such a border is saved and available to the drawing process for the adjoining sub-area. The adjoining sub-area receives information regarding the placement of the crossing label, and uses that placement as its own, such that the label is drawn again, and the part of it that is in the adjoining sub-area is included in the tiles generated at that location. This approach facilitates the property that tiles on different sides of sub-area borders can have features and labels running across them, and thereby allows the process of placement of features and labels to ignore the sub-area borders.

The same approach can be applied to the placement of route signs and area labels (and it may be combined with the methods previously mentioned of looking at the entire area being labeled). Pre-rendering decisions can similarly be made regarding how to draw intersecting roads that have grade-levels (ordering by height) assigned to them. In the case of such roads with grade levels, an area surrounding a set of crossing roads is determined in such a way that it can be regarded as independent for adjoining roads, and the decisions are made for this area, and saved so they are available for the drawing of adjoining sub-areas, in particular those that are intersecting with the area found to be isolated in regard to grade levels.

The available map data from various commercial vendors often vary greatly in coverage and quality. To achieve maps are of a high quality, it may be necessary to combine data from multiple sources. For example, one data set might have the most detailed outline of an airport area and the airport runways, while another set might have information about where the airport label could be placed, and a location that should be used for generating driving directions to and from the airport. To get the best from multiple map data sets, the map painter module 310 may be configured to obtain different sets of information from different sources, rather than just from one data set.

The notion of a large continual map available as tiles at multiple zoom levels is also attractive when the map area covers multiple countries and even continents. Again, such a system may be implemented using the methods previously described for dividing a map drawing into sub-areas, and accessing the map tile sets available for the different countries. This means that instead of just a map of the United States, for example, a single continuous map can be generated for the entire North American continent, or even the entire planet, at a full range of zoom levels.

Tile Serving

Tile serving can be implemented in multiple ways, as will be apparent in light of this disclosure. One approach is give each tile a file name and store it as an individual file. The tiles can then be placed on a server that makes them available by requests locally or over a network. For a web-based system, this server could be an HTTP server that names each tile according to latitude, longitude, and zoom level. This approach may put some strain on the serving system, in particular as the number of tiles can get very large.

There are many ways that a serving system can be assembled to ease the strain caused by a large number of tiles. For example, the system receiving a request for map tiles may have access to one or more efficient storage mediums (e.g., local caches) that each contains the full set of tiles or a subset thereof, and then may retrieve a tile from that storage medium, and pass it on in response to a request.

Figure 8:
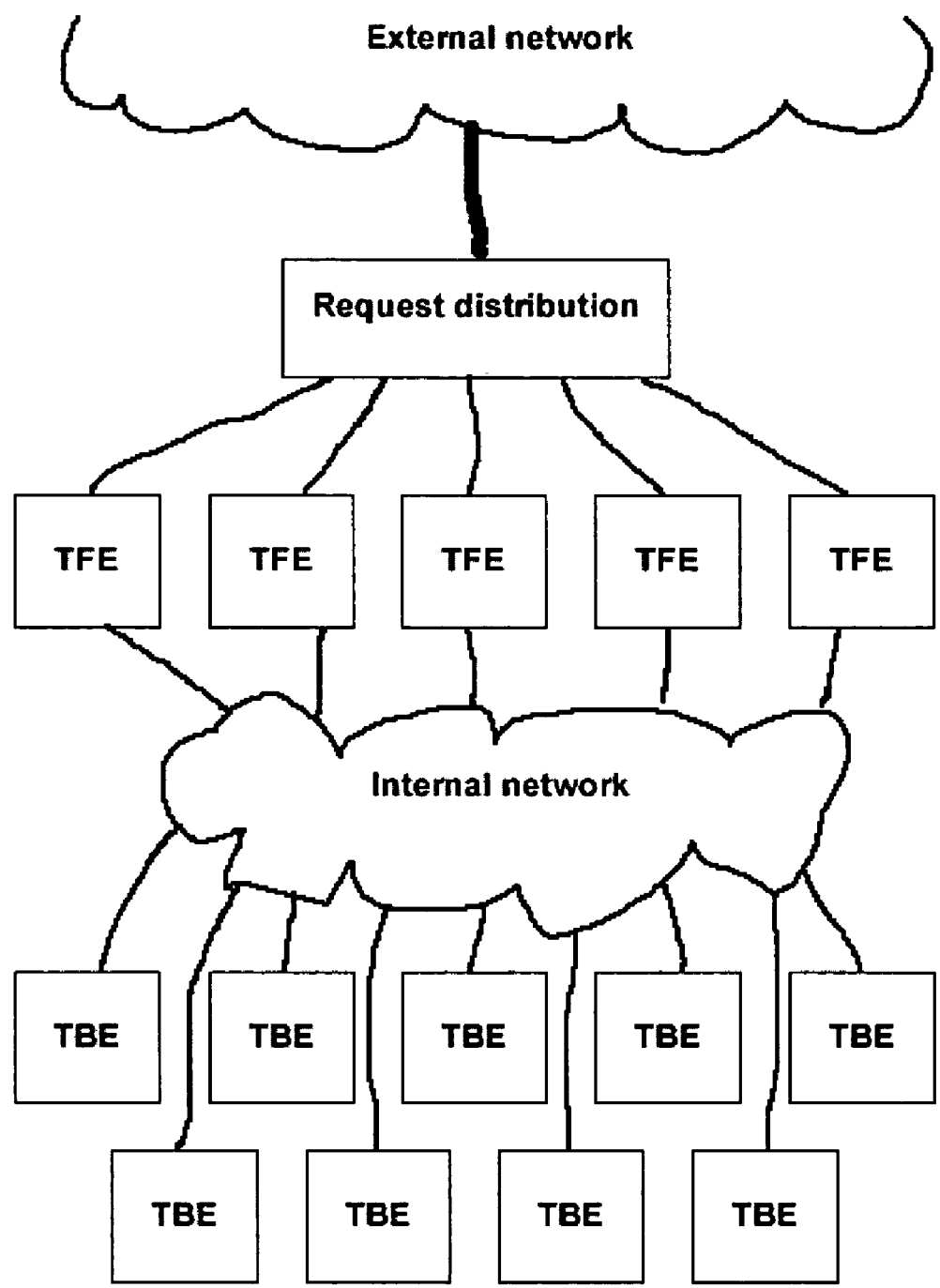
FIG. 8 is a block diagram of a map tile serving system configured in accordance with an embodiment of the present invention.

FIG. 8 is a block diagram of a map tile serving system configured in accordance with an embodiment of the present invention. This example configuration, which can be used to implement the tile serving system 115 of FIG. 1, attempts to make the system respond well if part of the storage system fails, and is also able to handle large sets of tiles and high volume traffic.

As can be seen, the tile serving system includes two types of tile servers: Tile Front End (TFE) and Tile Back End (TBE). These servers may communicate over an internal network or other medium. The requests for tiles coming from outside the system (e.g., via the external network) are evenly distributed between the TFEs via a request distribution subsystem that implements a load balancing scheme. The involved TFE then requests the map tiles from the appropriate TBE, and returns them to the requesting party.

In one possible implementation, all of the tiles may be stored on disk storage facilities of each TBE (e.g., in the storage device 220, which could also be tile storage 300). Here, the disk storage facilities are used such that each time a tile is requested by a TFE, the rest of the 64 tiles in the 8×8 block containing the tile are also read from the disk, and can reasonably be expected to be in the memory cache on the TBE (e.g., in the main memory 210). This embodiment uses an 8×8 block of tiles, so as to provide a total of 64 adjacent tiles at the same zoom level. Other embodiments can use other block dimensions (e.g., N×N or M×N).

Thus, any subsequent requests for tiles in the same 8×8 block from the same TBE can be handled without the need for disk access, and therefore more efficiently, unless the 8×8 block has been pushed out of the memory cache by more recent requests. If that is the case, the requested tile can be read from disk, and the 8×8 block may likely be placed in the memory cache again. Thus, if the balance between the sizes of the memory cache on a TBE and the amount of requests for often-accessed tiles is taken into account, a high percentage of the requests may be handled from the memory cache, making each TBE more efficient.

In one embodiment, the TFEs may be used to distribute the requests among the TBEs so that they may function in a way that reasonably balances between serving as much as possible from memory cache, without using an unreasonable number of TBEs and while still being able to serve the full tile set efficiently. To increase the percentage of tiles served from memory cache, it may be desirable to cause all of the TFEs to direct requests for a given tile (e.g., or 8×8 set of tiles) to the same TBE, and/or it may be desirable for the load on the TBEs to be evenly distributed, so as to benefit more fully from each TBE.

For instance, assume that there are 20 TBEs, and each is capable of caching ¹⁄₂₀ of an overall map. Thus, any one request for map data could be processed by a corresponding TBE using its cache memory. If one TBE fails, then its load can be distributed among the remaining 19 TBEs. In such a case, the cache memory of each remaining TBE would eventually grow (after a period of "learning") to include its share of the failed TBE's load.

These functions may be implemented in one embodiment by using the same hashing function on each TFE. The hashing function returns (or can be used to compute) the number of the TBE from which to request a given tile. Since the tiles are stored in memory in 8×8 blocks in one embodiment, each tile in a block should be requested from the same TBE. In this implementation, each tile may be numbered sequentially with an x and y value, based on longitude and latitude, and a z value representing the zoom level at which the tile was drawn. In one embodiment, a block may similarly be numbered such that its x and y are equal to the result of performing an integer division by 8 on any of the x and y value pairs of the tiles it contains. Thus, the hashing functions in one embodiment can be described as Hash(x div 8, y div 8, z). The value returned by the hash function may then be used to calculate a number corresponding to the TBE to use, as Hash(x div 8, y div 8, z) MOD N, where N is the number of TBEs in the system.

This hashing function approach may help to evenly distribute the load on a tile serving system, when there is no knowledge of how the load will be distributed amongst the individual tiles, once the system gets to a reasonable size. This approach, however, does not address the issue of having the system function well if one of the TBE stops functioning.

To address this issue, in one embodiment another input may be added to the hashing function, specifically, the number of attempts made at retrieving the tile from the TBEs. In this embodiment, the hashing function may be described as Hash(x div 8, y div 8, z, #attempts). Thus, if a TFE fails in its first attempt to retrieve a tile from a TBE, it may increase the #attempts by adding 1 to the start value of #attempts (e.g., 0 or 1), and then may execute the hashing function again, which will now take it to the next TBE for the tile. This process may be repeated until either the tile can be retrieved, or the #attempts reaches a preset threshold, typically a number significantly greater than the number of TBEs in the system.

This approach provides a number of advantages. Specifically, if a TBE goes down, the tiles it would normally serve will instead be served by the remaining TBEs, distributed by the hashing function. This can happen without any communication among the TFEs or TBEs, and may have little impact on the response time of the overall system. To further enhance the system, in one embodiment the TFEs might skip requests to TBEs that have failed within a short time period, or skip a fixed number of requests to a TBE that failed, or some combination thereof to limit the number of failed requests traveling within the system.

The system may also handle failure of multiple TBEs, and may start using the failed TBEs again after they start working again or have been replaced, possibly after a short delay (if the time or counting method for reducing failed requests previously mentioned has been implemented). Also, for example, a system with a total of N TBEs, where M of those TBEs have failed, may stabilize after a period of time and function as a system with only N-M TBEs, except for a small increase in response time caused by the failing attempts. Many failover with load sharing schemes will be apparent based on the principles described here.

The tiles produced by a map rendering process may contain a large percentage of tiles having a single color. Typically, this situation may occur with the colors used for water, land, parks, cities, campuses and other such areas. Since tiles that have the same single color in them are identical, the amount of storage needed on the TBEs may be greatly reduced in one embodiment by not storing these tiles individually. In some implementations, this may save 90+% of the storage space otherwise required.

To make the system able to serve these uni-colored tiles in one embodiment, an index may be created that contains information about each tile that has been created (e.g., a tile may be a normal tile, a uni-colored tile of a specific color, a broken tile, or a missing tile). Such an index may be stored on the TFEs in one implementation, allowing the TFEs to send a tile of the correct color to the client whenever a uni-colored tile is requested. These generic uni-colored tiles may be stored in memory cache (e.g., in the main memory 210) on the TFEs to make serving them as efficient as possible. The index may also be stored on the TBE machines, in which case the generic tiles would then be delivered to the TFEs from the TBEs, and then passed on to the requesting party.

In another embodiment, the information regarding uni-colored tiles may be present on the client side, either fully, for a part of the map area, or for a single tile. If the index is present on the serving part of the system, it may respond to the request for the information, and the client may simply request the information for the area it is currently displaying, and use the information to avoid requesting uni-colored tiles. Another embodiment would allow the TFEs (or TBEs through the TFEs) to respond to a request for a tile, not with a tile, but by returning the information that the requested tile only contains a certain color, and therefore can be replaced by a generic tile on the receiving side. In any such cases, the TBE or TFE causes the remote computing device to use uni-color map tiles that are locally available, so that such tiles do not have to be served. There are several ways of implementing optimizations based on the knowledge about uni-colored tiles within the full set of tiles in a drawn map, as will be apparent in light of this disclosure.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for generating map tiles for a tile-based digital mapping system comprising:
   a map painter module for generating digital map images;
   a tile maker for generating map tiles from the digital map images, wherein the tile maker operates according to a configuration file that defines areas and zoom levels for map tiles to be generated and the tile maker uses the map painter module to generate the digital map images for areas defined in the configuration file; and
   a tile storage for storing map tiles generated by the tile maker.

2. The system of claim 1 wherein the map painter module is operable to request and receive geographical data for a given area from which the digital map images are generated.

3. The system of claim 2 further comprising:
   a map data storage for storing one or more sets of the geographical data for a given area that is accessible by the map painter module.

4. The system of claim 3 wherein the map data storage includes a set of rich mapping format (RMF) files.

5. The system of claim 2 further comprising:
   a remote mapping engine (RML) library configured with an application program interface that allows the map painter module to access the geographical data.

6. The system of claim 1 wherein the configuration file defines geographical data sets to use for map tiles to be generated.

7. The system of claim 1 wherein the configuration file further defines a location for placement of a label.

8. The system of claim 1 wherein the tile maker is adapted to divide large areas defined in the configuration file into smaller areas, and uses the map painter module to generate the digital map images for those smaller areas.

9. The system of claim 1 wherein the tile maker is operable to pass information to the map painter module, receive from the map painter module a corresponding digital image that is based on the passed information, and divide the image into tiles.

10. The system of claim 1 wherein the tile maker is further configured to encode the generated map tiles into a desired image format, and to store the formatted map tiles.

11. The system of claim 1 wherein the desired image format is sub-pixel bitmaps.

12. The system of claim 1 further comprising
a map tile serving system configured to serve map tiles stored in the tile storage, in response to map requests from a user.

13. The system of claim 12 wherein the map tile serving system further comprises:
a plurality of front end tile servers for serving one or more map tiles requested by a user;
a request distributor for distributing requests for map tiles between the plurality of front end tile servers; and
a plurality of back end tile servers communicatively coupled with the plurality of front end tile servers, each back end tile server having access to the map tiles generated by the tile maker, and configured to provide requested map tiles to a corresponding front end tile server.

14. A map tile serving system configured to serve map tiles in response to map requests from a user, comprising:
a plurality of front end tile servers for serving one or more map tiles requested by a user;
a request distributor for distributing requests for map tiles between the plurality of front end tile servers; and
a plurality of back end tile servers communicatively coupled with the plurality of front end tile servers, each back end tile server having access to the map tiles, and configured to provide requested map tiles to a corresponding front end tile server;
wherein at least one of the front end tile servers can identify one or more uni-colored map tiles, and is configured to serve the uni-colored map tiles, without having to request those uni-colored map tiles from one of the back end tile servers.

15. The system of claim 14 wherein the one or more uni-colored map tiles are stored in a memory cache included in the at least one front end tile server.

16. The system of claim 14 wherein a user is communicating with the at least one front end server using a computing device, and the at least one front end server causes the computing device to use uni-color map tiles that are locally available to the computing device, so that such tiles do not have to be served.

17. The system of claim 14 wherein each of the map tiles is associated with an N×N block of map tiles, and each time a map tile is requested, all $N^2$ tiles in the corresponding N×N block are cached, thereby reducing the need for future disk access associated with those map tiles.

18. The system of claim 14 wherein the number of back end sewers is such that each back end server can be used to serve a particular sub-set of the map tiles, and each back end server is capable of caching its corresponding sub-set.

19. The system of claim 14 wherein each back end tile server is dedicated to sewing a sub-set of the map tiles, and each front end tile server is configured to identify an appropriate back end server to use in satisfying a user request for a map tile.

20. The system of claim 19 wherein each front end tile server uses a hashing function based on map tile coordinates to identify the appropriate back end sewer.

21. The system of claim 14 wherein in response to a back end tile server being unavailable to serve its load of map tiles, each front end tile server is configured to distribute that load among the remaining back end tile servers.

22. The system of claim 21 wherein each front end tile server uses a hashing function based on map tile coordinates and an attempt counter to distribute the load.

23. The system of claim 14 wherein each of the map tiles is associated with an N×N block of map tiles, and each time a map tile is requested, all $N^2$ tiles in the corresponding N×N block are served.

24. The system of claim 14 further comprising
a map tile generation system including a tile maker for generating the map tiles; and
a tile storage for storing the generated map tiles, wherein map tiles that are not available in caches of the front end or back end servers can be accessed from the tile storage.

25. A tile-based digital mapping method, comprising:
generating map tiles from digital map images;
storing the map tiles; and
serving one or more of the map tiles, in response to a user map request, wherein the serving further comprises
identifying uni-color map tiles that are locally available to a computing device of the user, and
causing the computing device to use uni-color map tiles that are locally available to the computing device, so that such tiles do not have to be sewed.

26. The method of claim 25 further comprising:
generating the digital map images, which includes defining areas and zoom levels for which map tiles should be generated.

27. The method of claim 26 wherein generating the digital map images further includes defining at least one from a group consisting of geographical data sets to use, and a location for placement of a label.

28. The method of claim 25 wherein storing the map tiles includes encoding the generated map tiles into a desired image format, and storing the formatted map tiles.

29. The method of claim 28 wherein the desired image format is sub-pixel bitmaps.

30. The method of claim 25 wherein serving one or more of the map tiles includes caching the sewed map tiles.

31. The method of claim 25 wherein generating map tiles from digital map images comprises:
identifying areas to be drawn, and respective various zoom levels at which to draw each area;
dividing the areas into sub-areas at the respective various zoom levels, such that each sub-area can be pre-rendered in an available memory;
pre-rendering each sub-area at a zoom level of the respective various zoom levels;
dividing each pre-rendered sub-area into rendering areas, such that each rendering area can be rendered in the available memory;
rendering the rendering areas to form a resulting image; and
dividing the resulting image into map tiles.

32. The method of claim 31 wherein pre-rendering each of the sub-areas at a zoom level represents a task, so as to provide a list of tasks defined by area and zoom level, and parallel processing is applied to executing these tasks.

33. The method of claim 31 wherein the map to be displayed to the requesting user has a resolution, and the rendering is done at a resolution N times greater than the resolution of the map to be displayed, and the bitmap produced by the rendering is used as input for generating tiles as sub-pixel bitmaps.

34. The method of claim 25 wherein generating map tiles from digital map images comprises:
identifying areas to be drawn;
dividing the areas into sub-areas, such that each sub-area can be pre-rendered in an available memory;
pre-rendering each sub-area;

dividing each pre-rendered sub-area into rendering areas, such that each rendering area can be rendered in the available memory; and rendering the rendering areas.

35. A method for generating digital map tiles from digital map data comprising:

identifying areas to be drawn, and various zoom levels at which each area needs to be drawn;

dividing the areas into sub-areas as needed at the different zoom levels, such that each sub-area can be pre-rendered in an available memory;

pre-rendering each sub-area at a given zoom level;

dividing each pre-rendered sub-area into rendering areas, such that each rendering area can be rendered in the available memory;

rendering the rendering areas to produce an image; and dividing the image into map tiles.

36. The method of claim 35 wherein pre-rendering each sub-area includes accessing at least one of geographical data sets and a representation of instructions about how to build the digital map image.

37. The method of claim 36 wherein the instructions are represented in a configuration file.

38. The method of claim 35 wherein the sub-areas each have a pre-determined fixed size.

39. The method of claim 35 wherein the sub-areas each have a pre-determined fixed size for each zoom level.

40. The method of claim 35 wherein pre-rendering decisions prevent labels from crossing borders between sub-areas.

41. The method of claim 35 wherein pre-rendering decisions are stored so they can be used in subsequent pre-rendering tasks.

42. The method of claim 35 wherein pre-rendering decisions allow features to cross borders between sub-areas.

43. The method of claim 42 wherein two aligning sub-areas associated with a border crossing feature are not allowed to be pre-rendered at the same time.

* * * * *

UNITED STATES PATENT AND TRADEMARK OFFICE
CERTIFICATE OF CORRECTION

| | | |
|---|---|---|
| PATENT NO. | : 7,599,790 B2 | Page 1 of 1 |
| APPLICATION NO. | : 11/088542 | |
| DATED | : October 6, 2009 | |
| INVENTOR(S) | : Jens Eilstrup Rasmussen, Lars Eilstrup Rasmussen and Stephen Ma | |

It is certified that error appears in the above-identified patent and that said Letters Patent is hereby corrected as shown below:

Column 16, line 48; replace "(RML)" with --(RME)--

Column 17, line 50; replace "sewers" with --servers--

Column 17, line 54; replace "sewing" with --serving--

Column 17, line 60; replace "sewer" with --server--

Column 18, line 20; replace "sewed" with --served--

Column 18, line 35; replace "sewed" with --served--

Signed and Sealed this

Fifth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,599,790 B2  Page 1 of 1
APPLICATION NO. : 11/088542
DATED : October 6, 2009
INVENTOR(S) : Rasmussen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1192 days.

Signed and Sealed this

Twenty-eighth Day of September, 2010

David J. Kappos
*Director of the United States Patent and Trademark Office*